United States Patent
Dibble et al.

(10) Patent No.: US 7,169,417 B2
(45) Date of Patent: *Jan. 30, 2007

(54) CALCIUM FORTIFICATION OF BREAD DOUGH

(75) Inventors: James W. Dibble, Port Jefferson, NY (US); Kevin W. Lang, Llyod Neck, NY (US); Gregory B. Murphy, Sands Point, NY (US)

(73) Assignee: Delavau LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/155,136

(22) Filed: Jun. 16, 2005

(65) Prior Publication Data

US 2006/0222737 A1     Oct. 5, 2006

Related U.S. Application Data

(63) Continuation-in-part of application No. 10/770,715, filed on Feb. 2, 2004.

(51) Int. Cl.
*A23L 1/304* (2006.01)
(52) U.S. Cl. .................. 426/74; 426/463; 426/549; 426/561; 426/658
(58) Field of Classification Search .............. 426/74, 426/658, 549, 561, 463
See application file for complete search history.

(56) References Cited

U.S. PATENT DOCUMENTS

| | | | |
|---|---|---|---|
| 2,970,915 A | 2/1961 | Ferrari | |
| 4,219,590 A | 8/1980 | Shibazaki et al. | |
| 4,859,473 A | 8/1989 | Arciszewski et al. | 426/19 |
| 5,066,499 A | 11/1991 | Arciszewski et al. | 426/19 |
| 5,108,761 A * | 4/1992 | Andon et al. | 426/2 |
| 5,108,764 A | 4/1992 | Craig et al. | 426/18 |
| 5,194,270 A | 3/1993 | Cante et al. | 427/74 |
| 5,219,602 A | 6/1993 | Saleeb et al. | 426/250 |
| 5,260,082 A * | 11/1993 | delValle et al. | 426/549 |
| 5,514,387 A | 5/1996 | Zimmerman et al. | 426/74 |
| 5,945,144 A | 8/1999 | Hahn et al. | 426/74 |
| 6,126,982 A | 10/2000 | Maldonado | 426/549 |
| 6,210,720 B1 | 4/2001 | Leusner et al. | 426/74 |
| 6,228,161 B1 * | 5/2001 | Drummond | 106/464 |
| 2005/0238760 A1 | 10/2005 | Ballman et al. | 426/74 |

OTHER PUBLICATIONS

G. S. Ranhotra et al.; "Increase in Bone Calcification in Young Rats Fed Breads Highly Fortified with Calcium"; *American Association of Cereal Chemists, Inc.;* vol. 76, No. 3, 1999; (pp. 325-327).

\* cited by examiner

*Primary Examiner*—Helen Pratt
(74) *Attorney, Agent, or Firm*—King & Spalding LLP

(57) ABSTRACT

Calcium additives useful for fortifying baked goods, such as bread products, with calcium are disclosed. The calcium additives are particularly useful for fortifying leavened baked goods with calcium. Methods for preparing the calcium additives and using the calcium additives to fortify baked goods are also disclosed. Generally, the calcium additives comprise suspensions of calcium carbonate in acidic aqueous solutions such as citric acid solutions.

30 Claims, No Drawings

CALCIUM FORTIFICATION OF BREAD DOUGH

This application is a continuation-in-part of U.S. patent application Ser. No. 10/770,715, filed Feb. 2, 2004.

FIELD OF INVENTION

The present invention relates generally to compositions and methods for enriching foods with calcium. More specifically, the present invention relates to suspensions of calcium carbonate in acidic aqueous solutions that are useful for enriching the calcium content of baked goods, particularly leavened bread products.

BACKGROUND OF THE INVENTION

Calcium is an essential nutrient and the most abundant mineral in the human body. Calcium plays a vital role in building healthy teeth and bones, blood clotting, muscle contraction, nerve function and heart function. In addition to these benefits, it has recently been suggested that calcium reduces the risk of recurrence of colon polyps. See Baron J. A. et al. *New England Journal of Medicine* 1999; 340: 101–107.

Most importantly, calcium reduces the risk of bone loss caused by osteoporosis in both men and women, a condition that afflicts more than 44 million individuals in the United States alone. With an aging population in the United States, it is estimated that the figure will rise to more than 61 million by the year 2020. This growing health crisis is largely a result of calcium deficiency in the diet.

In recognition of the benefits of calcium, doctors recommend high daily calcium intakes for people of all age groups. For example, the National Academy of Sciences ("NAS"), Institute of Medicine recommends the daily calcium intakes shown below.

| National Institute of Sciences, Institute of Medicine Dietary Reference Intake (DIR) of Calcium for Men And Women | |
|---|---|
| Age | DRI |
| 1–3 years | 500 mg |
| 4–8 years | 800 mg |
| 9–18 years | 1,300 mg |
| 19–50 years | 1,000 mg |
| 51 years and up | 1,200 mg |

Similarly, the United States Recommended Daily Allowance ("USRDA") of calcium for adults is 800 to 1,400 mg.

It has been estimated, however, that half of all Americans do not consume sufficient amounts of calcium. More troubling, 80% of women, the group at highest risk for developing osteoporosis, do not consume enough calcium. Further, estimates reveal that only 20% of girls and 50% of boys between the ages of 9 and 19 get the recommended daily intake of calcium. This is particularly troubling since 90% of human bone mass is developed by age 17. Thus, proper calcium consumption during these years is critical for preventing the onset of osteoporosis in later life.

For many individuals, it is difficult to meet the large daily intake of calcium suggested by physicians from dietary sources alone. This calcium deficiency is due in part to the low calcium content of foods that comprise the typical diet. Multi-vitamins and calcium supplement tablets represent an important alternative to dietary calcium. However, most commercially available multi-vitamin tablets provide only 10 to 20% of the recommended dose calcium. Calcium supplement tablets provide more calcium, typically 500 to 600 mg. To meet the recommendations, two tablets must be consumed daily. Unfortunately, too few people adhere to calcium supplement regimens, owing in part to the fact that presently available calcium tablets are very large and difficult or uncomfortable to swallow.

Milk is widely recognized as a good source of calcium. Several glasses of milk must be consumed each day in order to obtain sufficient calcium. For example, 9 to 18 year old children must consume at least four glasses of milk daily in order to receive the proper amount of calcium. However, the popularity of carbonated beverages has resulted in a decline in milk consumption among children. Further, many individuals who suffer from lactose intolerance cannot drink milk. Other individuals choose not to drink milk due to its high saturated fat content.

Health conscience consumers are increasingly demanding alternative sources of calcium from dietary products. This is evident from a recent study by Mintel's International showing an increase in food and drink products sold in North America which advertise calcium content. According to that study, 32% of dairy products, including milk and cheeses, 27% of beverages, and 18% of snacks advertise calcium content. In contrast, only 5% of bakery products noted calcium content. This is unfortunate since bread and cereal products are the most ubiquitous food source worldwide. For example, the U.S. Department of Agriculture estimates that approximately 200 pounds of flour and cereal products were consumed per capita in the United States in 2001, a figure which has been steadily growing for the past three decades. In contrast, only 22 gallons of milk were consumed per capita in the United States during the same period. Clearly, bread products would provide an ideal vehicle to supplement dietary calcium intake.

Unfortunately, conventional breads represent a poor source of calcium. The total mineral content of wheat generally ranges from 1 to 2% by weight. The minerals present in wheat are primarily distributed in the bran and are present in the endosperm, the wheat fraction from which most commercial flours are produced, to a much smaller degree. For instance, wheat typically contains about 0.45% by weight elemental calcium. The bran fraction contains about 0.128% by weight elemental calcium, whereas flour fractions such as farina, patent flour, and clear flour contain less than 0.03% by weight calcium. Breads made from these conventional flours will obviously contain only a small fraction of the recommended daily calcium intake.

It is conventional in the baking industry to add sources of calcium to bread products as "dough conditioners." Typically, calcium sulfate or calcium carbonate is added to dough in order to regulate pH and increase the electrolytic strength of soft water to prevent soft or sticky dough. Such calcium dough conditioners are usually added to dough from about 0.1 to 0.6% by weight. These calcium dough conditioners are not present in sufficient amounts to contribute significantly to the calcium value of the resulting bread products.

Calcium sulfate and calcium carbonate cannot be added directly to dough in sufficiently large amounts to contribute to the calcium content of bread due to inherent limitations imposed by the chemistry of the dough. In the fermentation process that occurs in leavened breads, pH plays a critical role in controlling yeast activity, amylolytic activity, and gluten behavior. The pH of bread typically ranges from about 5.1 to about 5.4. To reach these final pH levels, the dough must have final pH level as low as 4.5 to 5.2, however the pH must drop even lower during the fermentation process.

For example, in the typical commercial production of leavened bread by the sponge-dough process, the pH of the initially mixed sponge ingredients is about 5.3. As the fermentation process proceeds, the pH will rapidly drop over the first two hours of incubation. The drop in pH is principally the result of the lactic, succinic, and acetic acids produced by fermentation. Over the next two hours of fermentation, the pH will stabilize to a final value of about 4.7. When the remaining dough ingredients are added to the sponge, the pH will quickly rise back to its initial value of about 5.3 due to the diluting and buffering effects of the added flour. Subsequent fermentation again results in pH drop to a final value of about 5.0. As the dough is baked, volatilization of the fermentation acids causes the pH to rise to a final value of about 5.4 in the finished bread product. Some specialty breads such as French bread may have a pH as low as about 3.8 to 4.0, requiring even lower pH drops during the fermentation process.

Calcium salts such as calcium carbonate, calcium sulfate, and calcium citrate exert a buffering effect on dough chemistry by reacting with the organic acids produced during fermentation. Even relatively low levels of these calcium salts will prevent the pH from dropping during fermentation, interfering with the functioning of yeast and altering the flavor and texture of the resulting bread product. At higher levels, these salts can result in dough with a basic pH. Despite its low solubility in water, a saturated aqueous solution of calcium carbonate has a pH between 9 and 10 at ambient temperatures. Thus, calcium carbonate cannot be added directly to dough without upsetting the acidic pH characteristic of most bread dough. Further, the very low water solubility of calcium carbonate can result in granular precipitates when added in large quantities to dough. For these reasons, it is not adequate to fortify bread products by directly adding traditional calcium salts to dough.

To date, efforts to increase the calcium content of bread by other methods have met with only limited success.

U.S. Pat. No. 5,108,764 to Craig discloses the dough-up stage addition of calcium carbonate for its nutritive value in the production of reduced fat or no-added fat crackers. The amount of added calcium carbonate is described as "minor."

U.S. Pat. No. 6,126,982 to Maldonado discloses bread products having increased calcium contents produced from flours having large amounts of added middlings. That patent purports to provide bread products having up to 200% of the USRDA calcium dose per serving. However, the usefulness of the method disclosed by Maldonado is limited by the requirement of middling addition, since many commercial breads require highly purified flours.

U.S. Pat. No. 5,514,387 to Zimmerman, et al. discloses crackers and other baked goods providing greater than 10% of the USRDA calcium dose. The disclosed process uses emulsifier compositions such as combinations of polysorbate 60 and sodium stearoyl lactylate to reduce hardness and dry mouthfeel caused by the addition of insoluble calcium salts such as calcium carbonate. The fermented crackers produced by the method disclosed in this patent are reported to have pH values between 6.6 and 8.2, far higher than the tolerable pH of a typical commercial baked bread product.

U.S. Pat. Nos. 4,859,473 and 5,066,499 to Arciszewski et al disclose the addition of calcium carbonate to the dough-up stage in a process for preparing low sodium crackers and cookies. Calcium carbonate is added for its nutritive value in amounts up to about 10% by total weight. The resulting pH of the disclosed baked goods, between 6.5 and 8, is higher than the tolerable pH of most commercial baked bread products.

U.S. Pat. No. 6,210,720 to Leusner, et al. discloses lightly cooked cereal dough products fortified with at least 0.3% calcium. The disclosed process involves the addition of calcium carbonate having a small average particle size and a calcium sequestering agent such as phosphate salts or citric acid to a traditional cereal dough. The calcium carbonate and the calcium sequestering agent are added to the dough in conjunction with a wet blend. Calcium fortification of leavened bread products is not disclosed.

U.S. Pat. No. 5,945,144 to Hahn, et al. disclosed calcium fortified pasta produced by adding calcium salts such as calcium citrate to pasta dough before extrusion. The methods disclosed would not be applicable to prepare highly calcium fortified leavened bread products.

U.S. Pat. No. 5,260,082 to delValle, et al. discloses a calcium citrate additive for baked goods. The calcium citrate is prepared by reacting citric acid with calcium hydroxide or calcium carbonate in aqueous solution followed by spray drying to produce fine calcium citrate crystals. The calcium citrate crystals are added directly to the sponge to produce bread products alleged to have improved volume, shelf-life, and microwavability as compared to both control breads not having the additive and bread products prepared from commercially available calcium citrate. U.S. Pat. No. 5,260,082 does not disclose addition of calcium citrate to bread products for its nutritional value.

It would be desirable to enrich a variety of bread products with calcium in sufficient quantities to supply the recommended daily calcium dose. To this end, it would be desirable to enrich bread with calcium carbonate, since calcium carbonate is the most abundant and cost-efficient source of elemental calcium.

It is therefore an object of the present invention to provide bread products fortified with calcium, particularly in the form of calcium carbonate.

It is a further object of the present invention to provide calcium-fortified bread products having organoleptic properties, crumb structure, volume, and mouthfeel comparable to conventional breads.

It is a further object of the invention to provide calcium additives and methods for fortifying bread products with calcium additives.

SUMMARY OF INVENTION

In accordance with the foregoing objectives, the present invention provides baked products, such as bread products, that are highly fortified with calcium. Calcium additives and methods for preparing such calcium-fortified bread products are also provided.

It has surprisingly been found that suspensions of calcium carbonate in acidic aqueous solutions prepared under the conditions disclosed herein can be added to dough to increase calcium content without adversely affecting the properties of the dough. Without wishing to be bound by any theory, it is believed that the additives of the present invention exist as a fine suspension of calcium carbonate powder in an acidic environment provided by soluble inorganic or organic acids. This is unexpected as it is known that completely water-solubilized calcium carbonate reacts with acids to form calcium salts, carbon dioxide, and water. Such a reaction is evidenced by the evolution of carbon dioxide bubbles in appropriately prepared solutions of these ingredients. The removal of carbon dioxide in this manner would be expected to drive the reaction to completion. That is, insoluble calcium carbonate, which is in equilibrium with soluble calcium carbonate, would eventually be consumed in the presence of a stoichiometric amount of acid. The resulting solution of calcium salts would only be slightly less basic than calcium carbonate, but still above the pH of most dough.

When calcium additives are prepared according to the present invention, however, at ambient temperatures, there is only an initial vigorous evolution of gas, which dissipates after several minutes. The initial vigorous evolution of gas is typically characterized by foaming above the surface of the aqueous solution indicating that some amount of calcium carbonate has reacted with acid. After the initial reaction subsides, typically after about 30 seconds to about five minutes, only a small amount of evolved gas is observed and the majority of calcium carbonate remains as a suspension in water. Upon dissipation of initial foaming, the pH of the solution begins to stabilize. The residual evolution of gas is characterized by visible bubbling at the surface of the aqueous solution and typically diminishes in intensity over the next five to ten minutes. After the dissipation of foaming, the pH of the solution remains relatively stable for several minutes and possibly an hour or more. The relative stability of the pH and the dissipation of foaming after the initial reaction indicates that the compositions of the invention comprise relatively stable calcium carbonate suspensions that undergo reaction with the acid at only a slow rate. It will be noted, however, that the formation of calcium salts in low to moderate amounts is not deleterious to the practice of the invention as long as the pH of the solution remains sufficiently acidic such that the properties of dough will not be adversely effected upon addition of the calcium additive.

The calcium additives of the invention are highly manageable on an industrial scale and can be conveniently transferred to a dough mixer by tubing and the like. By the methods of the invention, the skilled artisan can select the proportions of reagents and reaction times to produce a calcium carbonate suspension having a pH that corresponds to the pH of any desired dough.

One aspect of the invention provides calcium additives for bread dough comprising an aqueous solution of an inorganic or an organic acid and calcium carbonate powder suspended in the aqueous solution of an inorganic or organic acid. The weight ratio of calcium carbonate to acid is from about 4:1 to about 20:1 and the weight ratio of water to the combined weight of calcium carbonate and acid is from about 1:1 to about 10:1. The pH of the aqueous solution is from about 3 to about 6.5. The preferred acid according to this aspect of the invention is citric acid.

Another aspect of the invention provides a method for preparing a calcium additive for dough comprising the steps of: (a) providing an aqueous solution of an inorganic or an organic acid; (b) providing calcium carbonate powder suspended in the aqueous solution of an inorganic or organic acid; (c) mixing the resulting suspension of calcium carbonate in an aqueous solution of an inorganic or an organic acid at a mixer speed sufficiently high to maintain a substantially homogenous suspension of calcium carbonate powder in the acidic aqueous solution; and (d) allowing the aqueous solution to reach a pH of about 3 to about 6.5. The weight ratio of calcium carbonate to acid is from about 4:1 to about 20:1 and the weight ratio of water to the combined weight of calcium carbonate and acid is from about 1:1 to about 10:1. In the preferred practice of this aspect of the invention the acid is an organic acid, and more preferably the acid is citric acid. The calcium carbonate is preferably provided as a powder having a small mean particle diameter.

Yet another aspect of the invention provides a method of fortifying dough with calcium. The method according to this aspect of the invention comprises the steps of: (a) providing a calcium additive comprising (i) an aqueous solution of an inorganic or an organic acid and (ii) calcium carbonate powder suspended in the aqueous solution of an inorganic or organic acid; wherein the weight ratio of calcium carbonate to acid is from about 4:1 to about 20:1 and the weight ratio of water to the combined weight of calcium carbonate and acid is from about 1:1 to about 10:1; and wherein the pH of the aqueous solution is about 3 to about 6.5; and (b) incorporating the calcium additive into a dough. In the preferred practice of this aspect of the invention the acid is an organic acid, and more preferably the acid is citric acid. Calcium fortified dough prepared in accordance with the methods of this aspect of the invention is also provided.

Another aspect of the invention provides a method of fortifying a hamburger bun with calcium comprising the steps of: (a) providing a calcium additive comprising (i) an aqueous solution of citric acid and (ii) calcium carbonate powder suspended in the aqueous solution of citric acid; wherein the weight ratio of calcium carbonate to citric acid is from about 4:1 to about 20:1 and the weight ratio of water to the combined weight of calcium carbonate and citric acid is from about 1:1 to about 10:1; and wherein the pH of the aqueous solution is about 3 to about 6.5; and (b) providing a hamburger bun dough comprising wheat flour, preferably patent flour; and (c) incorporating the calcium additive into the hamburger bun dough in a quantity sufficient to provide a hamburger bun upon baking having an elemental calcium content from about 0.1% to about 2.2% by weight of the hamburger bun.

A further aspect of the invention provides calcium fortified bread products comprising calcium from about 0.1% to about 2.2% by weight. The bread products according to this aspect of the invention preferably comprise flour that is substantially free of bran and/or wheat middlings. The pH of the bread is preferably from about 3.0 to about 6.5.

These and other aspects of the invention may be more clearly understood by reference to the following detailed description of the invention and the appended claims.

DETAILED DESCRIPTION OF THE INVENTION

In the following description of the invention, it is to be understood that the terms used have their ordinary and accustomed meanings in the art, unless otherwise specified. All weights referred to herein are given in terms of "% by weight" of the total composition, unless otherwise indicated. The term "% by flour weight" indicates that the ingredient is measured as a percentage of the total weight of flour alone. The term "elemental calcium" refers to the element calcium in any oxidation state, including $Ca^{+2}$. Accordingly, when the "weight" of elemental calcium is referred to herein, that phrase refers to the weight of the element calcium, whether the calcium is in the form of a salt or otherwise.

The calcium additives for bread dough according to one embodiment of the invention comprise an aqueous solution of an inorganic or an organic acid and calcium carbonate powder suspended in the aqueous solution of an inorganic or organic acid. The weight ratio of calcium carbonate to acid is from about 4:1 to about 20:1 and the weight ratio of water to the combined weight of calcium carbonate and acid is from about 1:1 to about 10:1. The pH of the aqueous solution is from about 3 to about 6.5. The calcium additive according to this aspect of the invention comprises water in a weight ratio from about 1:1 to about 5:1 in one embodiment and from about 1:1 to about 3:1 in another embodiment. The most preferred calcium additives comprises water in a weight ratio of about 1.8:1 based on the combined weight of the calcium carbonate and acid. In a preferred embodiment, the ratio of calcium carbonate to acid in the calcium additive ranges from about 7:1 to about 15:1 by weight, and more preferably, about 11:1. Preferred calcium additives have a pH of about 4.0 to about 6.5 and more preferably from about 4.5 to about 5.6.

Any acid compatible with food products may be used in the practice of the invention. The acid may be either an organic or an inorganic acid. Useful inorganic acids include but are not limited to phosphoric acid and sulfuric acid. More preferred acids according to the invention are organic acids, and more preferably, organic carboxylic acids. Appropriate organic acids include but are not limited to formic acid, acetic acid, ethanolic acid, adipic acid, citric acid, tartaric acid, glutaric acid, lactic acid, oxalic acid, ascorbic acid, glycolic acid, mevalonic acid, malic acid, tartronic acid, maleic acid, fumaric acid, malonic acid and succinic acid. Presently preferred carboxylic acids for use herein include citric acid, fumaric acid, lactic acid, and malic acid. An especially preferred acid is citric acid.

In the preferred practice of the invention, calcium carbonate is provided as a powder having a small mean particle diameter. In one embodiment, calcium carbonate is provided as a powder having a mean particle diameter from about 0.05 µm to about 30 µm. Preferably, the mean particle diameter of the calcium carbonate powder is from about 1 µm to about 25 µm, more preferably from about 5 µm to about 20 µm, and most preferably from about 10 µ to about 15 µm. As used herein, the symbol "µm" refers to micrometers.

It is well known in the art that calcium carbonate powders having a variety of median particle diameters are commercially available. For example, food grade and USP grade calcium carbonate powders having median particle diameters ranging from 0.7 to 20 µm are available from suppliers such as OMYA, Inc. (Alpharetta, Ga.), J.M Huber Corp. (Atlanta, Ga.), and Minerals Technologies Inc. (New York, N.Y.). Suitable calcium carbonate powders include but are not limited to those available from OMYA, Inc. under the trademarks OMYA-Cal FG 15, OMYA-Cal USP 15, OMYA-Cal LL OC FG 15 BTH, OMYA-Cal LL USP 15, OMYA-Cal LL USP 15 BTH, OMYA-Cal FG-10AZ, OMYA-Cal FG-6AZ, and OMYA-Cal USP-4AZ.

While the calcium additives according to this embodiment of the invention are preferably employed to enrich the calcium content of baked goods, particularly leavened breads, it is contemplated that these additives will also be useful for enriching the calcium content of a variety of food products.

In another embodiment of the invention, a method for preparing a calcium additive for dough is provided. This method comprises the steps of: (a) providing an aqueous solution of an inorganic or an organic acid; (b) providing calcium carbonate powder suspended in the aqueous solution of an inorganic or organic acid; wherein the weight ratio of calcium carbonate to acid is from about 4:1 to about 20:1 and the weight ratio of water to the combined weight of calcium carbonate and acid is from about 1:1 to about 10:1; (c) mixing the resulting suspension of calcium carbonate in an aqueous solution of an inorganic or an organic acid at a mixer speed sufficiently high to maintain the calcium carbonate powder as a substantially homogenous suspension in the aqueous solution; and (d) allowing the aqueous solution to reach a pH of about 3 to about 6.5. The calcium carbonate is preferably provided as a powder having a small mean particle diameter as described above. In a preferred embodiment, the ratio of calcium carbonate to acid, preferably citric acid, in the calcium additive ranges from about 7:1 to about 15:1 by weight, and more preferably about 11:1. In one embodiment, the weight ratio of water to the combined weight of calcium carbonate and acid is from about 1:1 to about 5:1. In another embodiment, the weight ratio of water to the combined weight of calcium carbonate and acid is from about 1:1 to about 3:1. Preferred calcium additives comprise water in a weight ratio of about 1.8:1 based on the combined weight of the calcium carbonate and acid. Preferred calcium additives have a pH of about 4.0 to about 6.5 and more preferably from about 4.5 to about 5.6.

Any mixing vessel may be used to combine the water, calcium carbonate, and citric acid. Preferably, the mixing vessel is the mixing bowl of a mechanical mixer such as a Hobart mixer. However, it is contemplated that the water, calcium carbonate, and citric acid may first be combined in one vessel and subsequently transferred to the mixing bowl of a suitable mixer. The calcium carbonate, citric acid, and water may be added in any order or added simultaneously to the mixing vessel. Preferably, the mixing vessel is first charged with water. It has been found desirable to employ a mixing vessel that is approximately twice the volume of added water or more since the initial vigorous reaction may result in foaming or vigorous bubbling which increases the total volume of material in the mixing bowl by up to 100%. It is contemplated that various anti-foaming agents such as silicone may be useful in the practice of the invention to mitigate the effects of foaming.

Any mixer that provides sufficient agitation to maintain the calcium carbonate as a substantially homogenous suspension in the aqueous solution may be used in the practice of the invention. Preferably, the mixer is a high speed mixer. As used herein, the phrase "high speed mixing" refers to mixing speeds capable of creating a deep vortex. At low agitation rates, the calcium carbonate may precipitate or settle out of the aqueous solution, resulting in a substantially non-homogenous suspension. It is within the knowledge of the skilled artisan to select an appropriate mixer and mixing conditions.

Upon addition of the ingredients and initiation of high speed mixing, an initial vigorous evolution of gas is observed. In the absence of anti-foaming agents, the initial reaction typically produces a foam, which increases the volume of the mixture from about 10% to about 100%. Depending on the selection of acid, the foam typically dissipates after about one or two minutes and yields to moderate to vigorous bubbling. The moderate to vigorous bubbling subsides after several minutes, typically about 4 to about 10 minutes. After about 4 to about 10 minutes, only a small amount of evolved gas is observed and the majority of calcium carbonate remains as a suspension in water. The duration of the initial vigorous production of carbon dioxide bubbles will depend upon a variety of factors such as, for example, temperature, mixing speed, mean particle diameter of calcium carbonate, volume of water utilized, selection of acid, and the ratio of calcium carbonate to acid. It is within the skill in the art to modify these and other parameters to control the duration of the initial vigorous evolution of gas. Typically, after about 4 to 10 minutes, the mixer speed is preferably lowered. The mixer speed is preferably adjusted to maintain the mixture as a substantially homogenous suspension. It will be understood that the reduction in mixer speed is merely a matter of convenience, as it has been found easier to manipulate the suspension at lower mixing speeds. That is, it has been found to be advantageous to transfer the calcium additive through tubing and the like at lower agitation rates. The pH of the solution remains relatively stable for several minutes, typically ten minutes, and possibly an hour or more. The skilled artisan can adjust the time of the reaction and the mixing speed to achieve a mixture having a desired pH.

In another embodiment of the invention a method of fortifying dough with calcium is provided. The method according to this embodiment of the invention comprises the steps of: (a) providing a calcium additive comprising (i) an aqueous solution of an inorganic or an organic acid and (ii) calcium carbonate powder suspended in the aqueous solution of an inorganic or organic acid; wherein the weight ratio of calcium carbonate to acid is from about 4:1 to about 20:1 and the weight ratio of water to the combined weight of calcium carbonate and acid is from about 1:1 to about 10:1; and wherein the pH of the aqueous solution is about 3 to about 6.5; and (b) incorporating the calcium additive into a dough. In a preferred embodiment, the ratio of calcium carbonate to acid, preferably citric acid, in the calcium additive ranges from about 7:1 to about 15:1 by weight, and more preferably about 11:1. In one embodiment, the weight ratio of water to the combined weight of calcium carbonate and acid is from about 1:1 to about 5:1. In another embodiment, the weight ratio of water to the combined weight of calcium carbonate and acid is from about 1:1 to about 3:1. Preferred calcium additives comprise water in a weight of about 1.8:1 based on the combined weight of the calcium carbonate and acid. Preferred calcium additives have a pH of about 4.0 to about 6.5 and more preferably from about 4.5 to about 5.6. In the preferred practice of this aspect of the invention, the calcium carbonate, citric acid and water are mixed for about 5 to about 10 minutes prior to addition to dough. The exact time of mixing may vary depending on factors such as the quantity of materials and the mixing speed. Preferably, the solution should be mixed long enough for the evolution of gas to substantially subside, but not so long that the solution develops a basic pH.

The calcium additives may be added to dough ingredients in any manner. For example, the calcium additives may be poured directly into the mixing bowl containing the dough ingredients. Alternatively, the calcium additives may be pumped into the mixing bowl containing the dough ingredients through tubing and the like. It is anticipated that the calcium additives of the invention will be well suited to large, industrial scale applications such as those used in commercial bakeries.

The calcium additives may be added to any type of dough. Preferably, the dough comprises a leavening agent. It is contemplated that the dough may comprise any leavening agent known in the art including but not limited to chemical leavening agents and bacterial leavening agents. In the preferred practice of the invention, the leavening agent is yeast.

The calcium additives are preferably added to dough from about 2 to about 10% by weight based on the weight of dough. More preferably, the calcium additives are added from about 4 to about 6% by weight based on the weight of dough. In the most preferred practice of the invention, the calcium additives are added from about 5 to about 6% by weight based on the weight of dough.

The calcium additives may be employed in any of the known methods for preparing bread dough, including but not limited to the "straight dough" method, the "sponge dough" method, the "continuous mixing" method, the "liquid sponge" method, the "liquid ferment" method, and the "no-time dough" method. The sponge dough method is the preferred method employed in commercial bakeries.

In the sponge dough method, a quantity of dough, called a "sponge," is prepared which serves as a pre-ferment. The sponge is combined with the balance of bread ingredients at a later stage. In a typical process, the sponge is formed by mixing over half of the flour, most if not all of the yeast, and a quantity of water sufficient to stiffen the dough, for about four minutes in a conventional dough mixer. The sponge is then set to ferment for about three to five hours depending on the amount of flour incorporated into the sponge. The fermented sponge is the mixed with the balance of ingredients in a dough mixer. The resulting dough is then set to ferment for an additional period from about fifteen minutes to one hour before baking. It will be understood that this procedure is merely representative and any variations and modifications of this method are contemplated to be with in the skill of the ordinary artisan In a sponge dough method, as with any method involving a pre-ferment stage, the calcium additive is preferably added to the dough rather than to the sponge. However, it is contemplated that the calcium additive may be added to the sponge before the remaining flour is combined with the sponge. Further, portions of the calcium additive may be added to both the sponge and the final dough. If a liquid ferment method is employed, it is preferable to add the calcium additive during the dough mixing stage after the ferment has been added.

In one embodiment, the final pH of the dough is from about 3.0 to about 6.0. In another embodiment, the final pH of the dough is from about 4.0 to about 5.8. In yet another embodiment, the final pH of the dough is from about 5.0 to about 5.4.

It will be understood that the optimal weight ratio of calcium carbonate to citric acid may vary within the suitable ranges based on the pH of the dough to which it is added. For example, it is not uncommon for some doughs, such as, for example, sourdough, to attain pH levels of 3.5 or lower during fermentation. With such highly acidic dough it is possible to adjust the ratio of calcium carbonate to acid toward the upper end of the suitable range, i.e., from about 15:1 to about 20:1. It will be evident to the skilled artisan to adjust the ratio in accordance with the desired pH of the dough.

The dough may contain any type of flour. Preferred flours are those traditionally used to prepare bread products. The most preferred flours according to the invention are those used to prepare white breads, buns, and rolls, such as patent flour and clear patent flour.

The term "flour" as used herein includes, but is not limited to patent flour, all-purpose flour, bleached flour, bread flour, cake flour, cookie flour, cracker flour, durum flour, enriched flour, farina, graham flour, pastry flour, rice flour, rye flour, self-rising flour, semolina, unbleached flour, wheat flour, whole-wheat flour, wheat meal, corn meal, corn flour, durum flour, rye meal, rye flour, oat meal, oat flour, soy meal, soy flour, sorghum meal, sorghum flour, potato meal, and potato flour.

Preferred flours for use in the present invention are patent flour, clear patent flour, all-purpose flour, farina flour, and bleached flour. The most preferred flours are those conventionally used to prepared white breads, buns, and rolls. Most preferred flours according to the invention have gluten contents from about 6 to about 14% by weight. In one embodiment of the invention, these preferred flours comprise 100% by weight of the total flour content of the dough. In other embodiments, the preferred flours comprise 99, 98, 97, 96, 95, 94, 93, 92, 91 or 90% by weight of the total flour content of the dough.

In one embodiment of the invention the dough comprises flour that is substantially free of wheat middlings. As used herein, flour that is "substantially free of wheat middlings" contains less than about 5% by weight wheat middlings. In another embodiment of the invention the dough comprises flour that is substantially free of bran. As used herein, flour that is "substantially free of bran" contains less than about 5% by weight bran.

While the foregoing description relates to dough made from flour, the invention is not so limited. It will be understood that the dough of the present invention may be prepared from flour alternatives. "Bread-type" products that do not comprise flour or are substantially free of flour may be prepared according to the present invention. Such bread-type products may be prepared from flour-free dough comprising, for example, gluten and grain. A bread-type product that is "substantially free" of flour will have a flour content of less than about 10% by weight based on total dry ingredients, and preferably will have a flour content of less than about 5% by weight based on total dry ingredients.

In addition to flour, the dough may contain any ingredients known in the art for use in bread products, including but not limited to salt, fat and oil, sugar, shortening, butter, milk, dry milk, yeast food, eggs, and vegetable gums.

Calcium fortified dough prepared in accordance with the methods of this aspect of the invention is also provided. The dough may be any type of dough known in the art, including but not limited to bread dough, bagel dough, pasta dough, cereal dough, cracker dough, cookie dough, cake dough, pastry dough, and pizza dough.

A further aspect of the invention provides calcium fortified baked products comprising calcium from about 0.1% to about 2.2% by weight. In one embodiment, the calcium fortified baked products comprise calcium from about 0.5% to about 1.8% by weight. In another embodiment, the calcium fortified baked products comprise calcium from about 0.8% to about 1.2% by weight. In still another embodiment, the calcium fortified baked products comprise calcium from about 0.9% to about 1.2% by weight. In yet another embodiment, the calcium fortified baked products comprise calcium from about 1.0% to about 1.2% by weight. It will be understood that the phrase "comprising calcium from about 0.2% to about 1.2% by weight" refers to the weight of elemental calcium rather than the weight of a calcium salt.

The baked products according to this aspect of the invention preferably comprise flour that is substantially free of bran and/or wheat middlings. Preferably, the baked products comprise patent flour.

In one embodiment, the pH of the calcium fortified baked product is from about 3.0 to about 6.0. In another embodiment the pH of the calcium fortified baked product is from about 4.0 to about 5.8. In yet another embodiment, the pH of the calcium fortified baked product is from about 5.0 to about 5.4.

The baked products according to this aspect of the invention are preferably bread products. The baked products according to this aspect of the invention may be leavened or unleavened bread products. The additives and methods disclosed herein are particularly useful in the preparation of leavened bread products.

Baked products according to the invention include, but are not limited to, white bread, wheat bread, tortillas, rolls and buns, specialty/artisan breads, rye bread, whole grain varietals, bagels, pasta, grain-based snack foods, cereals, crackers, cookies, cakes, muffins, pastries, pancakes, pizza crusts, doughnuts, danishes, grain-based nutritional supplements, and salty snacks such as pretzels, tortilla chips, corn chips, and potato chips.

The baked products provided by the present invention have a texture, crumb structure, taste, and "mouth feel" substantially identical to baked products that do not have added calcium. The baked products do not have a "grainy" texture that is characteristic of high levels of insoluble calcium carbonate.

The preferred bread products according to the invention are hamburger buns. Accordingly, a preferred embodiment of the invention is a method of fortifying a hamburger bun with calcium. The method comprises the steps of: (a) providing a calcium additive comprising (i) an aqueous solution of citric acid and (ii) calcium carbonate powder suspended in the aqueous solution of citric acid; wherein the weight ratio of calcium carbonate to citric acid is from about 4:1 to about 20:1 and the weight ratio of water to the combined weight of calcium carbonate and citric acid is from about 1:1 to about 10:1; and wherein the pH of the aqueous solution is about 3 to about 6.5; (b) providing a hamburger bun dough comprising wheat flour, preferably patent flour; and (c) incorporating the calcium additive into the hamburger bun dough. The weight ratio of calcium carbonate to citric acid from about 7:1 to about 15:1, more preferably from about 9:1 to about 13:1, are particularly useful ranges according to this embodiment. With respect to hamburger buns and other bread products having similar pH, the currently preferred weight ratio of calcium carbonate to citric acid is about 11:1.

In one embodiment, the weight ratio of water to the combined weight of calcium carbonate and citric acid in the calcium additive is from about 1:1 to about 5:1. In another embodiment, the weight ratio of water to the combined weight of calcium carbonate and citric acid is from about 1:1 to about 3:1. Preferred calcium additives according to this embodiment comprise water in a weight ratio of about 1.8:1 based on the combined weight of the calcium carbonate and citric acid.

Hamburger bun dough prepared according the invention will preferably comprise wheat flour. In a preferred embodiment, the wheat flour is patent flour. The wheat flour preferably will comprise about 99, 98, 97, 96, 95, 94, 93, 92, 91 or 90% by weight of the total flour content of the hamburger bun dough. While patent flour is the preferred flour according to this aspect of the invention, other highly purified flours such as clear patent flour may be substituted for patent flour. The calcium additive is incorporated into the hamburger bun dough in a quantity sufficient to provide a hamburger bun upon baking having an elemental calcium content from about 0.1% to about 2.2% by weight of the hamburger bun. In another embodiment, the hamburger bun upon baking has an elemental calcium content from about 0.8% to about 1.8% by weight of the hamburger bun. In yet another embodiment, the hamburger bun upon baking has an elemental calcium content from about 0.9% to about 1.2% by weight of the hamburger bun. In a further embodiment, the hamburger bun upon baking has an elemental calcium content from about 1.0% to about 1.2% by weight of the hamburger bun. The calcium carbonate powder is preferably one having a small mean particle diameter. Preferred calcium carbonate powders have mean particle diameters of about 0.05 μm to about 30 μm, more preferably from about 1 μm to about 25 μm, and even more preferably from about 5 μm to about 20 μm. The most preferred calcium carbonate powders according to this embodiment have mean particle diameters from about 10 μm to about 15 μm.

It will be understood that the recitation of certain ranges herein should not be construed to limit the disclosure to the endpoints disclosed. For example, the range "3.0 to 6.0" will be understood to disclose every value in between and is equivalent to the disclosure "3.0, 4.0, 5.0, and 6.0" or "3.0, 3.1, 3.2, 3.3 . . . 5.7, 5.8, 5.9, and 6.0." The intermediate values within each recited range are explicitly or inherently disclosed by the disclosure of the broader range. Similarly, the disclosure of a range will be understood to inherently disclose more narrow ranges therein. The phrase "about" is intended to modify every value within the range.

EXAMPLE 1

This example illustrates the use of various inorganic and organic acids in the practice of the invention. In each of the following experiments, 25 g of calcium carbonate powder (OMYA Cal Carb LL FG 15 PDR) was suspended in 60 ml of deionized water in a 150 ml graduated glass beaker equipped with a Teflon coated magnetic stir bar. The stirring speed was adjusted to provide a deep vortex. 5 g of acid was then added to the suspension and the pH of the aqueous phase was measured every minute using an Orion 420A+ pH meter. Table I provides the pH of each solution for a 10 minute period following addition of the acid to the solution.

TABLE I

The pH of Calcium Carbonate Suspensions in Various Acids

| Time (minutes) | Citric pH | Fumaric pH | Lactic pH | Malic pH | Phosphoric pH |
|---|---|---|---|---|---|
| 0 | 3.32 | 5.10 | 2.82 | 3.28 | 3.11 |
| 1 | 4.00 | 5.32 | 5.32 | 4.08 | 4.36 |
| 2 | 4.29 | 5.21 | 5.30 | 4.44 | 5.42 |
| 3 | 4.45 | 5.25 | 5.31 | 4.65 | 5.54 |
| 4 | 4.58 | 5.31 | 5.35 | 4.82 | 5.58 |
| 5 | 4.68 | 5.32 | 5.39 | 4.92 | 5.59 |
| 6 | 4.76 | 5.41 | 5.42 | 5.00 | 5.59 |
| 7 | 4.82 | 5.48 | 5.43 | 5.07 | 5.61 |
| 8 | 4.88 | 5.47 | 5.44 | 5.12 | 5.62 |
| 9 | 4.92 | 5.47 | 5.44 | 5.16 | 5.63 |
| 10 | 4.95 | 5.47 | 5.44 | 5.20 | 5.65 |

In each case, it can be seen that after an initially rapid increase in pH following the addition of each acid, the pH becomes relatively stable under these conditions. For example, the pH increase from the second to the tenth minute ranges from 0.14 for lactic acid to 0.76 for malic acid. It is clear from the data in Table II that calcium carbonate initially reacts with each acid to form some amount of calcium salt as evidenced by the rapid rise in pH. After approximately one or two minutes, however, the reaction slows and the pH of the aqueous suspensions of calcium carbonate becomes relatively stable under these conditions. In each case, the solution remains acidic after 10 minutes and is therefore suitable for addition to bread dough, particularly bread dough comprising a leavening agent.

In each case, vigorous bubbling was observed following the addition of the acid. The vigorous bubbling was evidenced by foaming which resulted in an increase in the total volume of the material in the beaker. That is, the surface of the solution was no longer visible due to the presence of foam above the surface.

In the case of citric acid, foaming lasted for approximately one minute after addition of the acid. The total volume in the beaker increased by approximately 12% during this time. After about 2 minutes, the foam had dissipated and the volume in the beaker returned to the initial value. After five minutes, there was almost no bubbling and the surface of the liquid was entirely visible When fumaric acid was added to an aqueous calcium carbonate suspension, the results were similar to those seen with citric acid. Initial foaming which resulted in an increase in the total volume in the beaker of about 12% subsided after about four minutes. After five minutes, the surface of the solution was entirely visible and only moderate bubbling was observed.

In the case of lactic acid, foaming increased the volume in the beaker by about 75% after addition of the acid. After about two minutes, the foam had settled to about 12% above the initial volume of the solution and held relatively constant until about four minutes after addition of the acid. After about eight minutes, the foaming had substantially dissipated and bubbling became visible on the surface of the solution.

When malic acid was added to an aqueous suspension of calcium carbonate, foaming lasted for approximately 20 seconds and increased the volume in the beaker by about 38%. After one minute, the foaming had largely dissipated an the volume in the beaker was about 12% greater than its initial value. After two minutes, the volume had returned to its initial value and no foaming was present. Bubbling was visible on the surface of the solution after two minutes, gradually decreasing in magnitude until only minimal bubbling was observed after eight minutes.

Phosphoric acid behaved similarly to the organic acids; however, the initial foaming was more substantial, resulting in a 100% increase in the volume of material in the beaker after about ten seconds as a result of vigorous foaming. After about 30 seconds to one minute, the foaming subsided resulting in a suspension having a volume about 12% greater than the initial value. After about four minutes, the surface of the liquid was visible and very little bubbling was observed.

EXAMPLE 2

This example provides a calcium additive according to the invention. 30 L of water was added to the mixing bowl of a Hobart mixer. The mixing bowl was 18 inches in diameter having 36-inch straight sides with a conical bottom and a volume of 60 L. To the water was added 12,106 g of calcium carbonate powder (OMYA Cal Carb LL OC FG 15) having a median particle diameter of 15 μm and 2,422 g of citric acid. The ingredients were mixed for 5 minutes at a "high" mixer speed. The mixer speed was selected so as to form a deep vortex. In the case of the Hobart mixer employed, a mixer speed of 1,440 rotations per minute was found to be adequate to provide a deep vortex. Initial foaming lasted for about one to two minutes and subsequently gave way to bubbling which subsided after approximately four to five minutes. After approximately five minutes, the mixer speed was lowered to approximately 720 rotations per minute and the pH of the solution was measured using an STD pH meter. The pH of solution was approximately 5. After an additional 5 minutes, the pH of the solution was measured again and found to be approximately 4.8. The calcium additive had the consistency of a uniform aqueous suspension of fine calcium carbonate powder.

EXAMPLE 3

This Example provides a calcium-fortified white bread made using the calcium additive of Example 2. The bread was made with the sponge and dough technique using the ingredients listed in Table II. In this Example, the calcium additive was added to the dough rather than the sponge.

TABLE II

| Ingredient | Sponge[1] | Dough | Total | % by Flour Weight | % by Weight |
|---|---|---|---|---|---|
| Flour[2] | 700.00 | 300.00 | 1000.00 | 100.00 | 53.46% |
| Water | 437.00 | 117.00 | 554.00 | 55.40 | 29.62% |
| HFCS[3] | | 182.00 | 182.00 | 18.20 | 9.73% |
| Yeast[4] | 14.00 | 6.00 | 20.00 | 2.00 | 1.07% |
| Vegetable Oil[5] | 12.54 | 37.00 | 49.54 | 4.95 | 2.65% |
| Salt[6] | 2.50 | 17.50 | 20.00 | 2.00 | 1.07% |
| SSL[7] | 3.00 | 0.00 | 3.00 | 0.30 | 0.16% |
| Datem[8] | | 1.00 | 1.00 | 0.10 | 0.05% |
| Emulsifier[9] | | 5.00 | 5.00 | 0.50 | 0.27% |
| Calcium Additive[10] | | 31.00 | 31.00 | 3.10 | 1.66% |
| Calcium Propionate[11] | | 1.10 | 1.10 | 0.11 | 0.06% |
| Gluten[12] | | 4.00 | 4.00 | 0.40 | 0.21% |

[1]All weights are provided in grams;
[2]patent flour from ADM;
[3]high fructose corn syrup from A E Staley;
[4]Fleischmann's;
[5]soy oil from Riceland Foods;
[6]US Salt;
[7]stearoyl-2-lactylate sold under the name Emplex by American Ingredients;
[8]diacetyl tartaric acid esters of monoglycerides sold under the name Panodan by Danisco;
[9]Max Soft 90 from American Ingredients;
[10]the calcium additive composition described in Example 2;
[11]Fleischmann's;
[12]vital wheat gluten from Manildra.

The calcium-fortified white bread prepared in this Example was made from patent flour having a protein content of 11% by weight. The sources of each ingredient listed in Table II are the same throughout the Examples that follow. The resulting bread contained 330 mg of elemental calcium for each 60 g serving size. The bread had a texture, crumb structure, taste, and "mouth feel" substantially identical to white bread.

EXAMPLE 4

This Example provides another calcium-fortified white bread made using the calcium additive of Example 2. The bread was made with the sponge and dough technique using the ingredients listed in Table III. In this Example, the calcium additive was added to the sponge.

TABLE III

| Ingredient | Sponge[1] | Dough | Total | % by Flour Weight | % by Weight |
|---|---|---|---|---|---|
| Flour | 700.00 | 300.00 | 1000.00 | 100.00 | 53.46% |
| Water | 437.00 | 117.00 | 554.00 | 55.40 | 29.62% |
| HFCS | | 182.00 | 182.00 | 18.20 | 9.73% |
| Yeast | 14.00 | 6.00 | 20.00 | 2.00 | 1.07% |
| Vegetable Oil | 12.54 | 37.00 | 49.54 | 4.95 | 2.65% |
| Salt | 2.50 | 17.50 | 20.00 | 2.00 | 1.07% |
| SSL | 3.00 | 0.00 | 3.00 | 0.30 | 0.16% |
| Datem | | 1.00 | 1.00 | 0.10 | 0.05% |
| Emulsifier | | 5.00 | 5.00 | 0.50 | 0.27% |
| Calcium Additive[2] | 31.00 | 0.00 | 31.00 | 3.10 | 1.66% |
| Calcium Propionate | | 1.10 | 1.10 | 0.11 | 0.06% |
| Gluten | | 4.00 | 4.00 | 0.40 | 0.21% |

[1]All weights are provided in grams.
[2]The calcium additive composition described in Example 2.

The calcium-fortified white bread prepared in this Example was made from patent flour having a protein content of 11% by weight. The resulting bread contained 330 mg of elemental calcium for each 60 g serving size. The bread had a texture, crumb structure, taste, and "mouth feel" substantially identical to white bread.

EXAMPLE 5

This Example provides a calcium-fortified white bread made using the calcium additive of Example 2. The bread was made with the straight dough technique using the ingredients listed in Table IV. In this Example, all of the ingredients, including the calcium additive, were combined to form the dough.

TABLE IV

| Ingredient | Total | % by Flour Weight | % by Weight |
|---|---|---|---|
| Flour | 1000.00 | 100.00 | 53.46% |
| Water | 554.00 | 55.40 | 29.62% |
| HFCS | 182.00 | 18.20 | 9.73% |
| Yeast | 20.00 | 2.00 | 1.07% |
| Vegetable Oil | 49.54 | 4.95 | 2.65% |
| Salt | 20.00 | 2.00 | 1.07% |
| SSL | 3.00 | 0.30 | 0.16% |
| Datem | 1.00 | 0.10 | 0.05% |
| Emulsifier | 5.00 | 0.50 | 0.27% |
| Calcium Additive[2] | 31.00 | 3.10 | 1.66% |
| Calcium Propionate | 1.10 | 0.11 | 0.06% |
| Gluten | 4.00 | 0.40 | 0.21% |

[1]All weights are provided in grams.
[2]The calcium additive composition described in Example 2.

The calcium-fortified white bread prepared in this Example was made from patent flour having a protein content of 11% by weight. The resulting bread contained 330 mg of elemental calcium for each 60 g serving size. The bread had a texture, crumb structure, taste, and "mouth feel" substantially identical to white bread.

EXAMPLE 6

This Example provides a calcium-fortified white bread made using the cacluim additive of Example 2. The bread was made with the no-time dough technique using the ingredients listed in Table V.

TABLE V

| Ingredient | Total | % by Flour Weight | % by Weight |
|---|---|---|---|
| Flour | 1200.00 | 100.00 | 54.23% |
| Water | 613.00 | 51.08 | 27.70% |
| HFCS | 219.00 | 18.25 | 9.90% |
| Yeast | 47.00 | 3.92 | 2.12% |
| Veg. Oil | 47.00 | 3.92 | 2.12% |
| Salt | 22.00 | 1.83 | 0.99% |
| SSL | 3.50 | 0.29 | 0.16% |
| Datem | 1.20 | 0.10 | 0.05% |
| Emulsifier | 12.00 | 1.00 | 0.54% |
| L-Cysteine | 4.00 | 0.33 | 0.18% |
| Calcium Additive[2] | 36.50 | 3.04 | 1.65% |
| Calcium Propionate | 1.40 | 0.12 | 0.06% |
| Gluten | 6.00 | 0.50 | 0.27% |

[1]All weights are provided in grams.
[2]The calcium additive composition described in Example 2.

The calcium-fortified white bread prepared in this Example was made from patent flour having a protein content of 11% by weight. The resulting bread contained 330 mg of elemental calcium for each 60 g serving size. The bread had a texture, crumb structure, taste, and "mouth feel" substantially identical to white bread.

EXAMPLE 7

This Example provides another calcium-fortified white bread made using the calcium additive of Example 2. The bread was made with the "liquid sponge" technique using the ingredients listed in Table III. This technique is similar to the sponge dough technique, however, the majority of the flour is added at the dough stage. In this Example, the calcium additive was added at the dough stage.

TABLE VI

| Ingredient | Sponge[1] | Dough | Total | % by Flour Weight | % by Weight |
|---|---|---|---|---|---|
| Flour | 506.00 | 694.00 | 1200.00 | 100.00 | 54.35% |
| Water | 486.00 | 127.00 | 613.00 | 51.08 | 27.77% |
| HFCS | | 219.00 | 219.00 | 18.25 | 9.92% |
| Yeast | 29.00 | 18.00 | 47.00 | 3.92 | 2.13% |
| Vegetable Oil | 12.54 | 34.11 | 46.65 | 3.89 | 2.11% |
| Salt | 5.01 | 16.47 | 21.48 | 1.79 | 0.97% |
| SSL | | 3.50 | 3.50 | 0.29 | 0.16% |
| Datem | | 1.20 | 1.20 | 0.10 | 0.05% |
| Emulsifier | | 12.00 | 12.00 | 1.00 | 0.54% |
| Calcium Additive[2] | 0.00 | 36.50 | 36.50 | 3.04 | 1.65% |
| Calcium Propionate | | 1.40 | 1.40 | 0.12 | 0.06% |
| Gluten | | 6.00 | 6.00 | 0.50 | 0.27% |

[1]All weights are provided in grams.
[2]The calcium additive composition described in Example 2.

The calcium-fortified white bread prepared in this Example was made from patent flour having a protein content of 11% by weight. The resulting bread contained 330 mg of elemental calcium for each 60 g serving size. The bread had a texture, crumb structure, taste, and "mouth feel" substantially identical to white bread.

The invention having been described by the forgoing description of the preferred embodiments, it will be understood that the skilled artisan may make modifications and variations of these embodiments without departing from the spirit or scope of the invention as set forth in the following claims.

EXAMPLES 8–13

The following examples illustrate the currently preferred aspects of the present invention.

EXAMPLE 8

This example provides a calcium additive according to the invention. 30 L of water is added to the mixing bowl of a Hobart mixer which is 18 inches in diameter having 36-inch straight sides with a conical bottom and a volume of 60 L. To the water is added 13,317 g of calcium carbonate powder (OMYA Cal Carb LL OC FG 15) having a median particle diameter of 15 μm and 1,211 g of citric acid. The ingredients are mixed as described in Example 2. The calcium additive has the consistency of a uniform aqueous suspension of fine calcium carbonate powder.

EXAMPLE 9

This Example provides a calcium-fortified white bread made using the calcium additive of Example 8. The bread is made with the sponge and dough technique using the ingredients listed in Table VII. In this Example, the calcium additive is added to the dough rather than the sponge.

TABLE VII

| Ingredient | Sponge[1] | Dough | Total | % by Flour Weight | % by Weight |
|---|---|---|---|---|---|
| Flour[2] | 700.00 | 300.00 | 1000.00 | 100.00 | 53.53 |
| Water | 437.00 | 117.00 | 554.00 | 55.40 | 29.66 |
| HFCS[3] | | 182.00 | 182.00 | 18.20 | 9.74 |
| Yeast[4] | 14.00 | 6.00 | 20.00 | 2.00 | 1.07 |
| Vegetable Oil[5] | 12.54 | 37.00 | 49.54 | 4.95 | 2.65 |
| Salt[6] | 2.50 | 17.50 | 20.00 | 2.00 | 1.07 |
| SSL[7] | 3.00 | 0.00 | 3.00 | 0.30 | 0.16 |
| Datem[8] | | 1.00 | 1.00 | 0.10 | 0.05 |
| Emulsifier[9] | | 5.00 | 5.00 | 0.50 | 0.27 |
| Calcium Additive[10] | | 28.50 | 28.50 | 2.8 | 1.53 |
| Calcium Propionate[11] | | 1.10 | 1.10 | 0.11 | 0.059 |
| Gluten[12] | | 4.00 | 4.00 | 0.40 | 0.21 |

[1]All weights are provided in grams;
[2]patent flour from ADM;
[3]high fructose corn syrup from A E Staley;
[4]Fleischmann's;
[5]soy oil from Riceland Foods;
[6]US Salt;
[7]stearoyl-2-lactylate sold under the name Emplex by American Ingredients;
[8]diacetyl tartaric acid esters of monoglycerides sold under the name Panodan by Danisco;
[9]Max Soft 90 from American Ingredients;
[10]the calcium additive composition described in Example 8;
[11]Fleischmann's;
[12]vital wheat gluten from Manildra.

The calcium-fortified white bread prepared in this Example is made from patent flour having a protein content of 11% by weight. The sources of each ingredient listed in Table VII are the same throughout the Examples that follow. The resulting bread contains 330 mg of elemental calcium for each 60 g serving size. The bread has a texture, crumb structure, taste, and "mouth feel" substantially identical to white bread.

EXAMPLE 10

This Example provides another calcium-fortified white bread made using the calcium additive of Example 8. The bread is made with the sponge and dough technique using the ingredients listed in Table VIII. In this Example, the calcium additive is added to the sponge.

TABLE VIII

| Ingredient | Sponge[1] | Dough | Total | % by Flour Weight | % by Weight |
|---|---|---|---|---|---|
| Flour | 700.00 | 300.00 | 1000.00 | 100.00 | 53.53 |
| Water | 437.00 | 117.00 | 554.00 | 55.40 | 29.66 |
| HFCS | | 182.00 | 182.00 | 18.20 | 9.74 |
| Yeast | 14.00 | 6.00 | 20.00 | 2.00 | 1.07 |
| Vegetable Oil | 12.54 | 37.00 | 49.54 | 4.95 | 2.65 |
| Salt | 2.50 | 17.50 | 20.00 | 2.00 | 1.07 |
| SSL | 3.00 | 0.00 | 3.00 | 0.30 | 0.16 |
| Datem | | 1.00 | 1.00 | 0.10 | 0.05 |
| Emulsifier | | 5.00 | 5.00 | 0.50 | 0.27 |
| Calcium Additive[2] | 28.50 | 0 | 28.50 | 2.85 | 1.53 |
| Calcium Propionate | | 1.10 | 1.10 | 0.11 | 0.06 |
| Gluten | | 4.00 | 4.00 | 0.40 | 0.21 |

[1]All weights are provided in grams.
[2]The calcium additive composition described in Example 8.

The calcium-fortified white bread prepared in this Example is made from patent flour having a protein content of 11% by weight. The resulting bread contains 330 mg of elemental calcium for each 60 g serving size. The bread has a texture, crumb structure, taste, and "mouth feel" substantially identical to white bread.

EXAMPLE 11

This Example provides a calcium-fortified white bread made using the calcium additive of Example 8. The bread was made with the straight dough technique using the ingredients listed in Table IX. In this Example, all of the ingredients, including the calcium additive, were combined to form the dough.

TABLE IX

| Ingredient | Total | % by Flour Weight | % by Weight |
|---|---|---|---|
| Flour | 1000.00 | 100.00 | 53.53 |
| Water | 554.00 | 55.40 | 29.66 |
| HFCS | 182.00 | 18.20 | 9.74 |
| Yeast | 20.00 | 2.00 | 1.07 |
| Vegetable Oil | 49.54 | 4.95 | 2.65 |
| Salt | 20.00 | 2.00 | 1.07 |
| SSL | 3.00 | 0.30 | 0.16 |
| Datem | 1.00 | 0.10 | 0.05 |
| Emulsifier | 5.00 | 0.50 | 0.27 |
| Calcium Additive[2] | 28.50 | 2.85 | 1.53 |
| Calcium Propionate | 1.10 | 0.11 | 0.06 |
| Gluten | 4.00 | 0.40 | 0.21 |

[1]All weights are provided in grams.
[2]The calcium additive composition described in Example 8.

The calcium-fortified white bread prepared in this Example is made from patent flour having a protein content of 11% by weight. The resulting bread contains 330 mg of elemental calcium for each 60 g serving size. The bread has a texture, crumb structure, taste, and "mouth feel" substantially identical to white bread.

EXAMPLE 12

This Example provides a calcium-fortified white bread made using the calcium additive of Example 8. The bread was made with the no-time dough technique using the ingredients listed in Table X.

TABLE X

| Ingredient | Total | % by Flour Weight | % by Weight |
|---|---|---|---|
| Flour | 1200.00 | 100.00 | 54.31% |
| Water | 613.00 | 51.08 | 27.74% |
| HFCS | 219.00 | 18.25 | 9.91% |
| Yeast | 47.00 | 3.92 | 2.13% |
| Veg. Oil | 47.00 | 3.92 | 2.13% |
| Salt | 22.00 | 1.83 | 1.0% |
| SSL | 3.50 | 0.29 | 0.16% |
| Datem | 1.20 | 0.10 | 0.05% |
| Emulsifier | 12.00 | 1.00 | 0.54% |
| L-Cysteine | 4.00 | 0.33 | 0.18% |
| Calcium Additive[2] | 33.60 | 2.8 | 1.52% |
| Calcium Propionate | 1.40 | 0.12 | 0.06% |
| Gluten | 6.00 | 0.50 | 0.27% |

[1]All weights are provided in grams.
[2]The calcium additive composition described in Example 8.

The calcium-fortified white bread prepared in this Example was made from patent flour having a protein content of 11% by weight. The resulting bread contained 330 mg of elemental calcium for each 60 g serving size. The bread had a texture, crumb structure, taste, and "mouth feel" substantially identical to white bread.

EXAMPLE 13

This Example provides another calcium-fortified white bread made using the calcium additive of Example 8. The bread was made with the "liquid sponge" technique using the ingredients listed in Table XI. This technique is similar to the sponge dough technique, however, the majority of the flour is added at the dough stage. In this Example, the calcium additive was added at the dough stage.

TABLE XI

| Ingredient | Sponge[1] | Dough | Total | % by Flour Weight | % by Weight |
|---|---|---|---|---|---|
| Flour | 506.00 | 694.00 | 1200.00 | 100.00 | 54.43% |
| Water | 486.00 | 127.00 | 613.00 | 51.08 | 27.80% |
| HFCS | | 219.00 | 219.00 | 18.25 | 9.93% |
| Yeast | 29.00 | 18.00 | 47.00 | 3.92 | 2.13% |
| Vegetable Oil | 12.54 | 34.11 | 46.65 | 3.89 | 2.13% |
| Salt | 5.01 | 16.47 | 21.48 | 1.79 | 0.97% |
| SSL | | 3.50 | 3.50 | 0.29 | 0.16% |
| Datem | | 1.20 | 1.20 | 0.10 | 0.05% |
| Emulsifier | | 12.00 | 12.00 | 1.00 | 0.54% |
| Calcium Additive[2] | 0.00 | 33.60 | 33.60 | 2.8 | 1.52% |
| Calcium Propionate | | 1.40 | 1.40 | 0.12 | 0.06% |
| Gluten | | 6.00 | 6.00 | 0.50 | 0.27% |

[1]All weights are provided in grams.
[2]The calcium additive composition described in Example 8.

The calcium-fortified white bread prepared in this Example was made from patent flour having a protein content of 11% by weight. The resulting bread contained 330 mg of elemental calcium for each 60 g serving size. The bread had a texture, crumb structure, taste, and "mouth feel" substantially identical to white bread.

The invention having been described by the forgoing description of the preferred embodiments, it will be understood that the skilled artisan may make modifications and variations of these embodiments without departing from the spirit or scope of the invention as set forth in the following claims.

We claim:

1. A composition comprising: (1) a mixture of dough ingredients; and (2) a calcium additive for dough comprising;
    (a) an aqueous solution of an inorganic or an organic acid; and
    (b) calcium carbonate powder suspended in said aqueous solution of an inorganic or organic acid wherein the calcium carbonate is provided as a powder having a mean particle diameter from about 0.05 um to about 30 um;
    wherein the weight ratio of calcium carbonate to acid is from about 4:1 to about 20:1 and the weight ratio of water to the combined weight of calcium carbonate and acid is from about 1:1 to about 10:1; and wherein the pH of the aqueous solution is from about 3 to about 6.5.

2. The calcium additive of claim 1 wherein the acid is an organic acid.

3. The calcium additive of claim 2 wherein the organic acid is selected from the group consisting of citric acid, fumaric acid, lactic acid, and malic acid.

4. The calcium additive of claim 3 wherein the acid is citric acid.

5. The calcium additive of claim 4 wherein the ratio of calcium carbonate to citric acid is from about 7:1 to about 15:1 by weight.

6. The calcium additive of claim 5 wherein the aqueous solution comprises water in a weight ratio from about 1:1 to about 5:1 based on the combined weight of calcium carbonate and citric acid.

7. The calcium additive of claim 6 wherein the aqueous solution comprises water in a weight ratio from about 1:1 to about 3:1 based on the combined weight of calcium carbonate and citric acid.

8. The calcium additive of claim 1 wherein the pH of the solution is from about 4.0 to about 6.5.

9. The calcium additive of claim 8 wherein the pH of the solution is from about 4.5 to about 5.6.

10. The calcium additive of claim 1 wherein the calcium carbonate is provided as a powder having a mean particle diameter from about 10 μm to about 15 μm.

11. A method of fortifying dough with calcium comprising the steps of:
  (a) providing a calcium additive comprising:
    (i) an aqueous solution of an inorganic or an organic acid; and
    (ii) calcium carbonate powder suspended in said aqueous solution of an inorganic or organic acid; wherein the calcium carbonate is provided as a powder having a mean particle diameter from about 0.05 um to about 30 um and the weight ratio of calcium carbonate to acid is from about 4:1 to about 20:1 and the weight ratio of water to the combined weight of calcium carbonate and acid is from about 1:1 to about 10:1; and wherein the pH of the aqueous solution is about 3 to about 6.5; and
  (b) incorporating the calcium additive into a dough.

12. The method of claim 11 wherein the acid is an organic acid.

13. The method of claim 12 wherein the organic acid is selected from the group consisting of citric acid, fumaric acid, lactic acid, and malic acid.

14. The method of claim 13 wherein the acid is citric acid.

15. The method of claim 14 wherein the ratio of calcium carbonate to citric acid is from about 7:1 to about 15:1 by weight.

16. The method of claim 15 wherein the aqueous solution comprises water in a weight ratio from about 1:1 to about 5:1 based on the combined weight of calcium carbonate and citric acid.

17. The method of claim 16 wherein the aqueous solution comprises water in a weight ratio of about 1:1 to about 3:1 based on the combined weight of calcium carbonate and citric acid.

18. The method of claim 11 wherein the calcium carbonate is provided as a powder having a mean particle diameter from about 10 μm to about 15 μm.

19. The method of claim 11 wherein the dough comprises a leavening agent.

20. The method of claim 19 wherein the leavening agent is yeast.

21. The method of claim 11 wherein the dough has a final pH of about 3.0 to about 6.0.

22. The method of claim 11 wherein the mixture is added to the dough in an amount from about 1 to about 10% by flour weight based on the total weight of flour.

23. The method of claim 11 wherein the aqueous mixture is added to one of the group consisting of: the sponge in a sponge dough process, the dough in a sponge dough process, the dough in a straight dough process, the dough in a liquid ferment process, the dough in a no-time dough process, or the dough in a continuous mix process.

24. Dough prepared by the method of claim 11.

25. A method of fortifying a hamburger bun with calcium the steps of:
  (a) providing a calcium additive comprising:
    (i) an aqueous solution of citric acid; and
    (ii) calcium carbonate powder suspended in said aqueous solution of citric acid; wherein the calcium carbonate is provided as a powder having a mean particle diameter from about 0.05 um to about 30 um and the ratio of calcium carbonate to citric acid is from about 4:1 to about 20:1 and the weight ratio of water to the combined weight of calcium carbonate and citric acid is from about 1:1 to about 10:1; and wherein the pH of the aqueous solution is about 3 to about 6.5;
  (b) providing a hamburger bun dough comprising wheat flour; and
  (c) incorporating said calcium additive into said hamburger bun dough in a quantity sufficient to provide a hamburger bun upon baking having an elemental calcium content from about 0.1% to about 2.2% by weight of the hamburger bun.

26. The method of claim 25 wherein said calcium additive is incorporated into said hamburger bun dough in a quantity sufficient to provide a hamburger bun upon baking having an elemental calcium content from about 0.8% to about 1.8% by weight of the hamburger bun.

27. The method of claim 26 wherein said calcium additive is incorporated into said hamburger bun dough in a quantity sufficient to provide a hamburger bun upon baking having an elemental calcium content from about 1.0% to about 1.2% by weight of the hamburger bun.

28. The method of claim 25 wherein the aqueous solution comprises water in a weight ratio from about 1:1 to about 5:1 based on the combined weight of calcium carbonate and citric acid.

29. The method of claim 28 wherein the aqueous solution comprises water in a weight ratio of about 1:1 to about 3:1 based on the combined weight of calcium carbonate and citric acid.

30. The method of claim 25 wherein said wheat flour comprises patent flour.

* * * * *

UNITED STATES PATENT AND TRADEMARK OFFICE
CERTIFICATE OF CORRECTION

| | | |
|---|---|---|
| PATENT NO. | : 7,169,417 B2 | Page 1 of 1 |
| APPLICATION NO. | : 11/155136 | |
| DATED | : January 30, 2007 | |
| INVENTOR(S) | : James W. Dibble, Kevin W. Lang and Gregory B. Murphy | |

It is certified that error appears in the above-identified patent and that said Letters Patent is hereby corrected as shown below:

Title Page, Item [75], Inventors, Line 2, "Llyod" should read --Lloyd--
Claim 1, lines 51-52, "0.05 um to about 30 um" should read --0.05 μm to about 30 μm--
Claim 11, lines 24-25, "0.05 um to about 30 um" should read --0.05 μm to about 30 μm--
Claim 25, line 13, after "calcium" insert --comprising--
Claim 25, line 20, "0.05 um to about 30 um" should read --0.05 μm to about 30 μm--

Signed and Sealed this

Twenty-sixth Day of June, 2007

JON W. DUDAS
*Director of the United States Patent and Trademark Office*